(12) United States Patent
Rohr et al.

(10) Patent No.: US 9,984,033 B2
(45) Date of Patent: May 29, 2018

(54) SYSTEMS AND METHODS FOR BIASING A BUS

(75) Inventors: Daniel J. Rohr, Wildwood, MO (US); Richard Earl Jenkins, Lake Saint Louis, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 489 days.

(21) Appl. No.: 14/401,927

(22) PCT Filed: May 21, 2012

(86) PCT No.: PCT/US2012/038800
§ 371 (c)(1),
(2), (4) Date: Nov. 18, 2014

(87) PCT Pub. No.: WO2013/176649
PCT Pub. Date: Nov. 28, 2013

(65) Prior Publication Data
US 2015/0149671 A1    May 28, 2015

(51) Int. Cl.
*G06F 13/42*    (2006.01)
*G06F 13/40*    (2006.01)
(Continued)

(52) U.S. Cl.
CPC ...... *G06F 13/4072* (2013.01); *G06F 13/4282* (2013.01); *H04L 25/028* (2013.01);
(Continued)

(58) Field of Classification Search
None
See application file for complete search history.

(56) References Cited

U.S. PATENT DOCUMENTS 6,188,271 B1    2/2001    Wang et al.
6,542,946 B1    4/2003    Wooten
(Continued)

FOREIGN PATENT DOCUMENTS

CN    1702640 A    11/2005
CN    2872753 Y    2/2007
(Continued)

OTHER PUBLICATIONS

International Search Report from corresponding PCT application PCT/US2012/038800 dated Aug. 17, 2012.
(Continued)

*Primary Examiner* — Henry Tsai
*Assistant Examiner* — Aurangzeb Hassan
(74) *Attorney, Agent, or Firm* — Lando & Anastasi, LLP

(57) ABSTRACT

A bi-directional differential bus interface that includes a differential transmitter having a non-inverting terminal and an inverting terminal, a differential receiver having a non-inverting terminal and an inverting terminal, and a biasing circuit that is electrically coupled to the non-inverting terminal of the differential transmitter and the inverting terminal of the differential transmitter. The biasing circuit is configured to generate a voltage between the non-inverting terminal of the differential transmitter and the inverting terminal of the differential transmitter that is approximately 200 mV or more in response to assertion of a control signal received on a control input of the biasing circuit.

18 Claims, 4 Drawing Sheets

(51) Int. Cl.
*H04L 25/02* (2006.01)
*G06F 13/38* (2006.01)

(52) U.S. Cl.
CPC ...... *H04L 25/0272* (2013.01); *H04L 25/0292* (2013.01); *G06F 13/385* (2013.01); *G06F 13/4295* (2013.01)

(56) References Cited

U.S. PATENT DOCUMENTS

| | | |
|---|---|---|
| 6,864,704 B1 | 3/2005 | Wong et al. |
| 7,245,154 B1 | 7/2007 | Davidson et al. |
| 7,639,745 B2 | 12/2009 | Bonelli et al. |
| 2003/0198296 A1* | 10/2003 | Bonelli ............... H04L 25/0272 375/257 |
| 2005/0259756 A1 | 11/2005 | Kasahara |
| 2007/0073506 A1 | 3/2007 | Boskovic |
| 2007/0146284 A1 | 6/2007 | Kota |
| 2007/0229046 A1 | 10/2007 | Johnson et al. |
| 2008/0008213 A1 | 1/2008 | Blancha et al. |
| 2010/0111200 A1 | 5/2010 | Tanimoto |
| 2010/0135370 A1* | 6/2010 | Best ................... G06F 13/4072 375/219 |

FOREIGN PATENT DOCUMENTS

| | | |
|---|---|---|
| CN | 1953331 A | 4/2007 |
| CN | 101512358 A | 8/2009 |
| CN | 201826830 U | 5/2011 |

OTHER PUBLICATIONS

Extended European Search Report from corresponding EP Application No. 12877228.2 dated Dec. 16, 2015.

* cited by examiner

SYSTEMS AND METHODS FOR BIASING A BUS

CROSS-REFERENCE TO RELATED APPLICATIONS

This application is a U.S. National Stage Application under 35 U.S.C. § 371 of International Application No. PCT/US2012/038800, filed May 21, 2012, which is hereby incorporated herein by reference in its entirety.

BACKGROUND OF THE INVENTION

Field of the Invention

Embodiments of the present invention are generally directed to systems and methods for biasing a bus, and more particularly to systems and methods for biasing a bi-directional differential bus.

Discussion of Related Art

Recommended Standard 485 (RS-485) and the related Telecommunications Industry Association/Electronic Industries Alliance standard 485 (TIA/EIA-485) have become an industry standard serial communication interface for multipoint, bi-directional, differential data transmission due to their relatively low cost, high noise rejection, and fast data rates, even over relatively long cable lengths. RS/TIA/EIA-485 interfaces are used to implement the physical layer for data transmission in various standard and proprietary automation protocols, including Modbus™ and Profibus™.

FIG. 1 illustrates a typical implementation of a communication network using an RS/TIA/EIA-485 bus. As shown, the communication network or bus 100 includes a plurality of nodes 110a, 110b, 110c, 110d (Nodes 1-N) that are interconnected by a pair of wires 130a, 130b. Each of the nodes includes at least one associated processor (not shown) that is capable of communicating with other nodes on the network or bus 100. The nodes 110a-d may be any device capable of communicating over the network or bus 100, such as a computer system, a control system, an intelligent UPS, cooling equipment, various types of factory automation equipment, etc. In a typical implementation the wires 130a, 130b are twisted (i.e., a twisted pair of wires) to improve noise immunity. Each of the nodes 110a-d has an RS/TIA/EIA-485 interface that includes a RS/TIA/EIA-485 transceiver 120a, 120b, 120c, 120d having a differential transmitter 122a-d and a differential receiver 126a-d. It should be appreciated that rather than using a transceiver (e.g., an integrated circuit that includes both a differential transmitter and a differential receiver), separate differential transmitters and receivers may be used.

Each differential transmitter 122a-122d includes a non-inverting terminal 123a-d and an inverting terminal 124a-d, and similarly, each differential receiver 126a-d includes a non-inverting terminal 127a-d and an inverting terminal 128a-d. Data is transmitted by each differential transmitter 122a-d as a difference in voltage levels between the non-inverting terminal 123a-d and the inverting terminal 124a-d of the respective differential transmitter 122a-d. Similarly, data received by each differential receiver 126a-d is interpreted by the receiver based upon the difference in voltage levels between the non-inverting terminal 127a-d and the inverting terminal 128a-d of the respective differential receiver 126a-d. Where the difference in voltage between the non-inverting terminal 127a-d and the inverting terminal 128a-d of the respective differential receiver 126a-d is greater than approximately 200 mV, a mark (i.e., a logic 1) is received, and where the difference in voltage between the non-inverting terminal 127a-d and the inverting terminal 128a-d of the respective differential receiver 126a-d is less than approximately −200 mV, a space (i.e., a logic 0) is received. In a transceiver that is specifically designed for half-duplex communication, the non-inverting terminal of the differential transmitter may be electrically connected to the non-inverting terminal of the differential receiver, and the inverting terminal of the differential transmitter electrically connected to the inverting terminal of the differential receiver, as shown in FIG. 1. In such a transceiver, a pair of output pins are provided, with pin A (termed the 'non-inverting pin') corresponding to Tx+/Rx+ and with pin B (termed the 'inverting pin') corresponding to Tx−/Rx−. It is noted that this description of what voltage level represents a mark or a space, and which pins are denoted A or B conforms to industry standard usage. In the actual RS/TIA/EIA-485 standards, pin A is denoted the 'inverting pin' and corresponds to Tx−/Rx−, pin B is denoted the 'non-inverting pin' and corresponds to Tx+/Rx+, a mark is received when the voltage difference B−A is greater than approximately 200 mV, and a space is received when the voltage difference B−A is less than approximately −200 mV. For the remainder of this document, the industry standard usage applies.

Although the network topology shown in FIG. 1 is for half-duplex communication, RS/TIA/EIA-485 may also be used for full-duplex communication. In such a full-duplex communication network, each node would be interconnected using two twisted pairs of wires, one twisted pair for Tx+ and Tx−, and the other twisted pair for Rx+ and Rx−.

In a typical RS/TIA/EIA-485 communication network, and as illustrated in FIG. 1, the ends of the network or bus 100 are terminated with a resistor 140, 142 connected between each wire 130a, 130b of the twisted pair. The value of each termination resistor 140, 142 is based upon the characteristic impedance of the pair of wires 130a, 130b, and a typical value for standard twisted pair wiring is about 120 Ohms. The presence of the termination resistors 140, 142 at the ends of the network reduces reflections that can be caused by fast driver edges, and also reduces noise sensitivity due to the lower impedance.

As known to those skilled in the art, during those periods of time in which the communication network or bus 100 is idle (i.e., when no node is actively transmitting data over the RS/TIA/EIA-485 bus), the bus may drift into an indeterminate state in which the voltage difference between the A and B pins of a differential receiver drops below the specified 200 mV range. Where this occurs, the differential receivers on the bus can pass false traffic to the devices to which they are connected, and may saturate the bus. To prevent this situation, it is common to fail safe one of the nodes on the bus (typically the master node) to bias the bus to a known state in the absence of any node actively driving the bus. As shown in FIG. 1, this is typically done by electrically connecting one of the wires 130a to a supply voltage (e.g., 5 V) via a pull-up resistor 150, and connecting the other wire 130b to ground via a pull-down resistor 152. The values of the pull-up and pull-down resistors may vary, dependent upon the number of nodes on the network or bus, but typical values for the pull-up and pull-down resistors range from about 680 Ohms to about 750 Ohms.

Many device manufacturers understand the importance of using termination resistors at the ends of the network as well as the importance of fail safe biasing using pull-up and pull-down resistors at one of the devices on the network. However, because no device manufacturer necessarily knows where their device may be used, how many other devices may be interconnected (a RS/TIA/EIA-485 bus may support up to 64 nodes or more), and which of those devices may already have been configured with pull-up and pull-down transistors, there remain a great many instances in the field where the bus is improperly biased. Various approaches have been taken to deal with this issue, including doing nothing and simply accepting a certain amount of bus noise, providing jumpers or DIP switches on each device to permit a user to apply an appropriate bias, providing a little bit of bias in each device in the hope that, when interconnected with other devices that may each provide a little bit of bias, an appropriate bias is provided, etc.

SUMMARY OF THE INVENTION

In accordance with an aspect of the present invention, a bi-directional differential bus interface is provided. The bi-directional bus interface comprises a differential transmitter having a non-inverting terminal and an inverting terminal, a differential receiver having a non-inverting terminal and an inverting terminal, and a biasing circuit that is electrically coupled to the non-inverting terminal of the differential transmitter and the inverting terminal of the differential transmitter. The biasing circuit is configured to generate a voltage between the non-inverting terminal of the differential transmitter and the inverting terminal of the differential transmitter that is at least approximately 200 mV in response to assertion of a control signal received on a control input of the biasing circuit.

In accordance with one embodiment, the differential transmitter is a first differential transmitter and the biasing circuit includes a first bias resistor, a second bias resistor, and a second differential transmitter having a non-inverting terminal that is electrically coupled to the non-inverting terminal of the first differential transmitter through the first bias resistor and an inverting terminal that is electrically coupled to the inverting terminal of the first differential transmitter through the second bias resistor. In accordance with an aspect of this embodiment, the second differential transmitter has an enable terminal and the enable terminal of the second differential transmitter is configured to receive the control signal. In accordance with one embodiment, the first differential transmitter has an enable terminal configured to receive an enable signal, and the control signal is a logical inverse of the enable signal. In accordance with another embodiment, the bi-directional differential bus interface is associated with a processor configured to assert the control signal in response to an instruction that the bi-directional differential bus interface is to be biased. In accordance with yet another embodiment, the bi-directional differential bus interface is associated with a processor configured to assert a bias enable signal in response to an instruction that the bi-directional differential bus interface is to be biased, the first differential transmitter has an enable terminal configured to receive an enable signal, and the control signal is asserted based on assertion of the bias enable signal and a logical inverse of the enable signal.

In accordance with alternative embodiment the biasing circuit includes a first switch electrically coupled in series with a first resistor, and a second switch electrically coupled in series with a second resistor. The first switch and the first resistor are coupled in series between the a voltage supply terminal and the non-inverting terminal of the differential transmitter, and the first switch has a control terminal configured to electrically couple the non-inverting terminal of the differential transmitter to the voltage supply terminal through the first resistor in response to assertion of the control signal. The second switch and the second resistor are coupled in series between the a reference voltage terminal and the inverting terminal of the differential transmitter, and the second switch has a control terminal configured to electrically couple the inverting terminal of the differential transmitter to the voltage reference terminal through the second resistor in response to assertion of the control signal.

In accordance with one aspect of this embodiment, the bi-directional differential bus interface is associated with a processor configured to assert the control signal in response to an instruction that the differential bus interface is to be biased. In accordance with another aspect of this embodiment, the bi-directional differential bus interface is associated with a processor configured to assert a bias enable signal in response to an instruction that the bi-directional differential bus interface is to be biased, the differential transmitter has an enable terminal configured to receive an enable signal, and the control signal is asserted based on assertion of the bias enable signal and a logical inverse of the enable signal.

In accordance with any of the above aspects and embodiments, the differential transmitter and the differential receiver are disposed in a single integrated circuit transceiver, the non-inverting terminal of the differential transmitter is electrically connected to the non-inverting terminal of the differential receiver, and the inverting terminal of the differential transmitter is electrically connected to the inverting terminal of the differential receiver.

In accordance with another embodiment, the bi-directional differential bus interface is a full-duplex bi-directional differential bus interface and the bi-directional differential bus interface further comprises a third bias resistor, a fourth bias resistor, and a third differential transmitter having a non-inverting terminal that is electrically coupled to the non-inverting terminal of the differential receiver through the third bias resistor, an inverting terminal that is electrically coupled to the inverting terminal of the differential receiver through the fourth bias resistor, and an enable terminal to receive the control signal. In accordance with this embodiment, the third differential transmitter is configured to generate a voltage between the non-inverting terminal of the differential receiver and the inverting terminal of the differential receiver that is at least 200 mV in response to assertion of the control signal.

In accordance with another aspect of the present invention, a method of biasing a bi-directional differential bus interface is provided for a bi-directional differential bus interface that includes a differential transmitter having a non-inverting terminal and an inverting terminal and a differential receiver having a non-inverting terminal and an inverting terminal. The method comprises acts of receiving an instruction to bias the bi-directional bus interface to a determined state, asserting a control signal in response to receipt of the instruction, and generating, in a biasing circuit that is electrically coupled to the non-inverting terminal of the differential transmitter and the inverting terminal of the differential transmitter, a voltage that is at least approximately 200 mV between the non-inverting terminal of the differential transmitter and the inverting terminal of the differential transmitter in response to the assertion of the control signal.

In accordance with one embodiment, the differential transmitter includes an enable input to receive an enable signal that is asserted during transmission of data by the differential transmitter, and the act of generating is performed only during those periods of time in which the enable signal is not asserted.

In accordance with another embodiment, the method can further comprise acts of receiving a second instruction to stop biasing the bi-directional differential bus interface to the determined state, de-asserting the control signal in response to receipt of the second instruction, and ceasing to generate the voltage difference in response to the de-assertion of the control signal. In accordance with one embodiment of the present invention in which the differential transmitter is a first differential transmitter, the act of generating can include generating the voltage using a second differential transmitter having a non-inverting terminal that is electrically coupled to the non-inverting terminal of the first differential transmitter through a first resistor and an inverting terminal that is electrically coupled to the inverting terminal of the first differential transmitter through a second resistor. In accordance with an alternative embodiment of the present invention, the act of generating can alternatively include switchably connecting the non-inverting terminal of the differential transmitter to a voltage supply terminal through a first resistor, and switchably connecting the inverting terminal of the differential transmitter to a voltage reference terminal through a second resistor.

In accordance with another aspect of the present invention, a bi-directional differential bus interface is provided that comprises a differential transmitter having a non-inverting terminal and an inverting terminal, a differential receiver having a non-inverting terminal and an inverting terminal, and means, electrically coupled to the non-inverting terminal of the differential transmitter and the inverting terminal of the differential transmitter, for generating a voltage between the non-inverting terminal of the differential transmitter and the inverting terminal of the differential transmitter that is at least approximately 200 mV in response to assertion of a control signal.

In accordance with one embodiment, the differential transmitter is a first differential transmitter, and the means for generating the voltage difference includes a first bias resistor, a second bias resistor, and a second differential transmitter having a non-inverting terminal that is electrically coupled to the non-inverting terminal of the first differential transmitter through the first bias resistor and an inverting terminal that is electrically coupled to the inverting terminal of the first differential transmitter through the second bias resistor.

In accordance with an alternative embodiment, the means for generating the voltage difference includes a first switch electrically coupled in series with a first resistor, and a second switch electrically coupled in series with a second resistor. The first switch and the first resistor are electrically coupled in series between the a voltage supply terminal and the non-inverting terminal of the differential transmitter with the first switch having a control terminal configured to electrically couple the non-inverting terminal of the differential transmitter to the voltage supply terminal through the first resistor in response to assertion of the control signal. The second switch and the second resistor are electrically coupled in series between a reference voltage terminal and the inverting terminal of the differential transmitter with the second switch having a control terminal configured to electrically couple the inverting terminal of the differential transmitter to the voltage reference terminal through the second resistor in response to assertion of the control signal.

In accordance with a further aspect of either of the above alternative embodiments, the bi-directional differential bus interface is associated with a processor configured to assert a bias enable signal in response to an instruction that the bi-directional differential bus interface is to be biased, the first differential transmitter has an enable terminal configured to receive an enable signal, and the control signal is asserted based on assertion of the bias enable signal and a logical inverse of the enable signal.

BRIEF DESCRIPTION OF THE DRAWINGS

The accompanying drawings are not intended to be drawn to scale. In the drawings, each identical or nearly identical component that is illustrated in various figures. is represented by a like numeral. For purposes of clarity, not every component may be labeled in every drawing. In the drawings.

DETAILED DESCRIPTION

Figure 1:
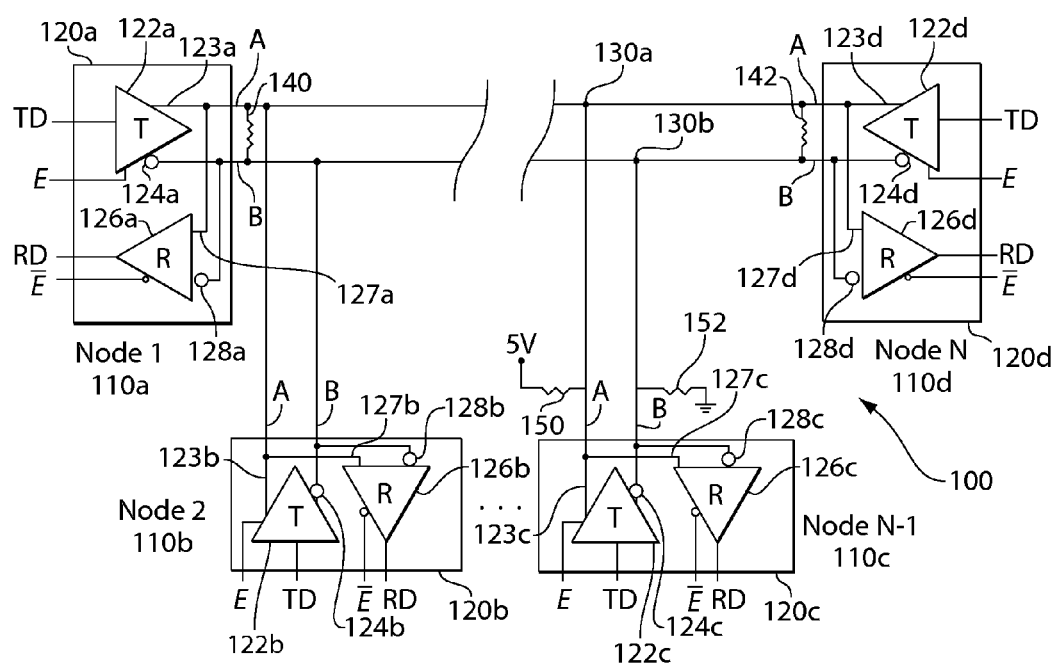
FIG. 1 illustrates a conventional implementation of a RS/TIA/EIA-485 communication network.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 2:
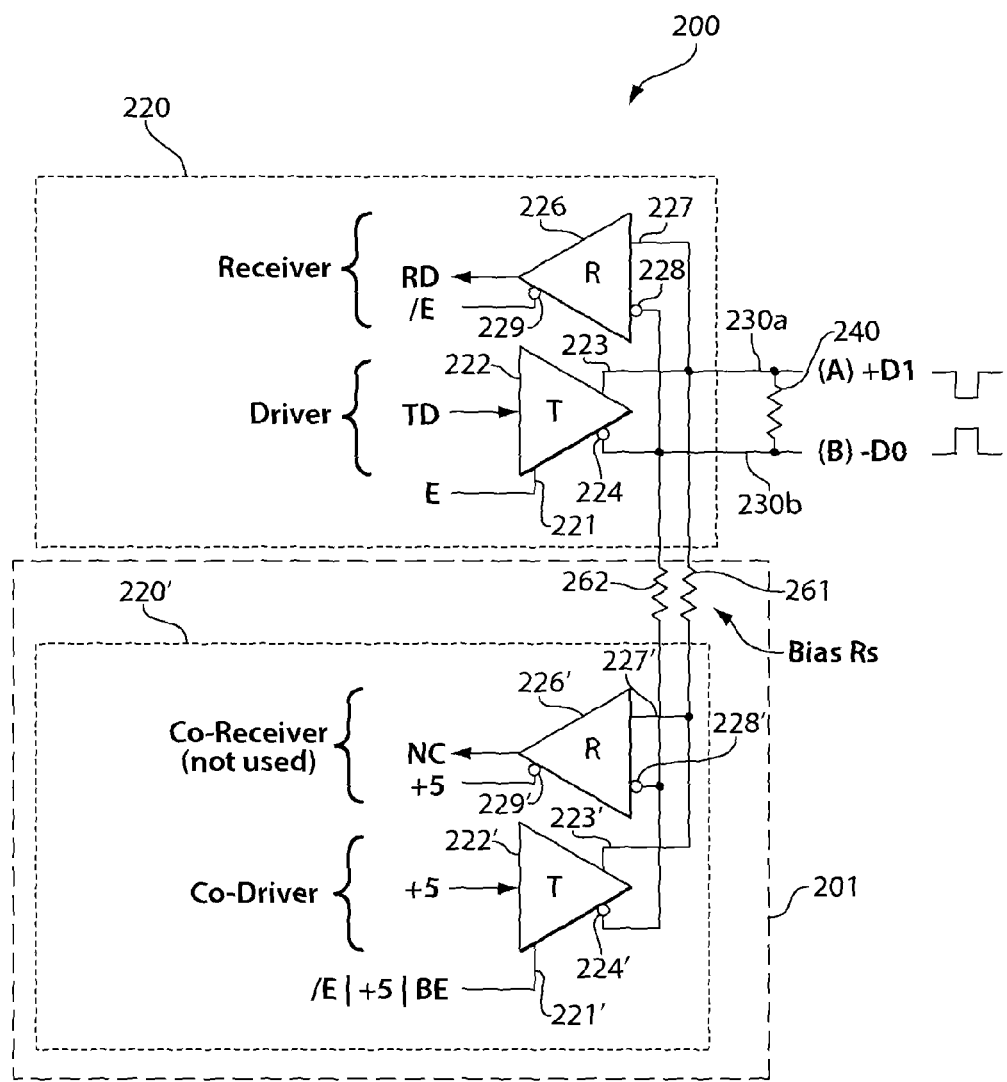
FIG. 2 is a schematic illustration of a differential bus interface that includes a differential bus biasing circuit in accordance with an embodiment of the present invention.

FIG. 2 is a schematic illustration of a differential bus interface that includes a differential bus biasing circuit in accordance with an embodiment of the present invention. As shown, the differential bus interface 200 includes a differential transceiver 220, such as an RS/TIA/EIA-485 transceiver that is similar to the transceivers 120a-d described above in connection with FIG. 1. Similar to the differential transceivers described above with respect to FIG. 1, the differential transceiver 220 includes a differential transmitter 222 having a non-inverting terminal 223 and an inverting terminal 224, and a differential receiver 226 having a non-inverting terminal 227 and an inverting terminal 228. Although not designated by a reference numeral in FIG. 1, each of the differential transmitter 222 and receiver 226 includes an enable terminal 221, 229 to receive an enable signal (E or /E) to enable the transmitter or receiver. As shown in FIG. 2, a logic true (e.g., 1) state of the enable signal E enables the transmitter 222 and disables the receiver 226 and the logic false (e.g., 0) state disables the transmitter 222 and enables the receiver 226. The enable signal /E is the logical inverse of the enable signal E. Where the interface 200 is associated with an end node of the bus, a termination resistor, such as termination resistor 240, may be present.

In accordance with one embodiment of the present invention, the differential bus biasing circuit 201 includes a second transceiver 220' that is used to bias the differential bus to a determined state. Generally, the voltage difference necessary between the pairs of wires 230a, 230b to maintain such a determined state when no transmitter is actively driving the bus is approximately 200 mV or more. Because the first transition of the bus indicates the start of a character (e.g., a start bit), it is desirable to bias the bus so that the difference in voltage between the non-inverting pin A and the inverting pin B is approximately +200 mV or more.

In the differential bus biasing circuit 201 shown in FIG. 2, the differential receiver 226' of the second transceiver 220' is not used and the receive data signal line may be left unconnected, as shown. To reduce power and/or noise, the enable input 229' of the receiver 226' may be connected to a high voltage, such as the voltage supply, to effectively disable the receiver 226'. The non-inverting terminal 223' of the differential transmitter 222' is electrically connected to the non-inverting pin A through a first bias resistor 261 and the inverting terminal 224' of the differential transmitter 222' is electrically connected to the inverting pin B through a second bias resistor 262. As discussed further with respect to Table 1 below, resistance values for the bias resistors 261, 262 are selected to limit the bias current that the bus and the terminating resistors (i.e., terminating resistors 140 and 142 in FIG. 1) at each end of the bus will see, but also to generate enough current across the terminating resistors to create a voltage drop of approximately 200 mV or more. In accordance with one embodiment, the bias resistors 261, 262 can each have a resistance value of 475 Ohms, although other resistance values may be used.

The transmit data input terminal of the differential transmitter 222' is electrically connected to a high voltage, such as the supply voltage terminal Vcc, to ensure that when the differential transmitter 222' is enabled, the non-inverting pin A is pulled high and the inverting pin B is pulled low (i.e., to output a mark signal). In accordance with an aspect of the present invention, the enable input 221' of the differential transmitter 222' may be connected in one of a number of ways to bias the bus to an appropriate level. In one embodiment, the enable input 221' of the differential transmitter 222' is connected to a high voltage (e.g., +5V), such as the supply voltage terminal Vcc, such that the bus is biased by the differential transmitter 222' whenever the transceiver 220' is powered on. In another embodiment, the enable input 221' of the differential transmitter 222' is connected to receive the inverse of the enable signal E (i.e., /E) provided to the differential transmitter 222. In this embodiment, the differential transmitter 222' will bias the bus to an appropriate level during those periods of time in which the differential transmitter 222 is inactive (i.e., when the enable signal E is low and /E is high). In yet another embodiment, the enable input 221' of the differential transmitter 222' is connected to receive a bias enable (BE) signal that can be asserted under the programmed control of an associated processor (e.g., a processor on the device associated with the bus interface 200). In yet a further embodiment, the enable input 221' of the differential transmitter 222' is connected to a logic gate (e.g., an AND gate) that receives a bias enable signal (BE) that can be asserted under the programmed control of an associated processor and an inverse of the enable signal E (i.e., /E) provided to the differential transmitter 222. In such an embodiment, the differential transmitter 222' will bias the bus to an appropriate level only when instructed to do so by the associated processor (i.e., when the bias enable signal BE is active) and during those periods of time in which the differential transmitter 222 is inactive (i.e., when the enable signal E is low and /E is high).

Table 1 below illustrates the manner in which the electrical properties of a RS/TIA/EIA-485 bus or communication network may vary dependent on the resistance value selected for the bias resistors 261, 262, the resistance value of the termination resistors, and the number of nodes on the bus. In general, the resistance of the bias resistors 261, 262 should be sufficiently sized so that they generate enough current across the termination resistors 140, 141 (see FIG. 1) to create an IR drop of approximately 200 mV or more, but not so large as to generate a bias current that would contend with the other nodes' drivers. In Table 1, it is assumed that the differential transmitter 222' (also referred to herein as the "Co-driver") will nominally drive 0 and 5V output levels. It is also assumed that the resistance value of each of the termination resistors 140, 141 is 120 Ohms, that there are only two termination resistors disposed at each extreme end of the bus, and that the input impedance Z of each "unit load" transceiver is approximately 12 K Ohms, such that the loading of the bus increases with each added node. In Table 1 below, "N-master" is used to denote the number of non-master nodes on the bus, "Rdrv" denotes the impedance of the bus based upon the number of nodes on the bus (e.g., the combined impedance of each nodes' transceiver), "Rterm" denotes the resistance of the termination resistor at each end of the bus (or where more than one node is present, the parallel equivalent resistance of two termination resistors each having a resistance of 120 Ohms), "Rload" is the parallel equivalent resistance of Rdrv and Rterm, "RB" is an exemplary resistance value of each bias resistor 261, 262, "Va" is the nominal voltage of the non-inverting pin A when the Co-driver 222' is actively driving a mark state, "Vb" is the nominal voltage of the inverting pin B when the Co-driver 222' is actively driving the mark state, and Vab is the differential voltage between the non-inverting pin A and the inverting pin B when the Co-driver 222' is actively driving the mark state, given the other parameters. As can be seen from Table 1, a resistance value of approximately 525 Ohms sufficient to provide a voltage difference of more than approximately 200 mV where the number of slave nodes on the bus varies between one and sixty three (i.e., between two to sixty four total nodes). Although the value of 525 Ohms may be further optimized to account for other circuit loads, Table 1 demonstrates that an additional transceiver may be used to bias the bus to a determined state.

TABLE 1

| N-master | V | Rdrv | Rterm | Rload | RB | Va | Vb | Vab |
|---|---|---|---|---|---|---|---|---|
|  | 5 | 12000 | 120 |  | 525 |  |  |  |
| 1 |  | 6000 | 60 | 59 |  | 2.634 | 2.366 | 0.268 |
| 2 |  | 4000 | 60 | 59 |  | 2.633 | 2.367 | 0.266 |
| 4 |  | 2400 | 60 | 59 |  | 2.632 | 2.368 | 0.264 |
| 6 |  | 1714 | 60 | 58 |  | 2.631 | 2.369 | 0.262 |
| 8 |  | 1333 | 60 | 57 |  | 2.630 | 2.370 | 0.259 |
| 10 |  | 1091 | 60 | 57 |  | 2.628 | 2.372 | 0.257 |
| 15 |  | 750 | 60 | 56 |  | 2.626 | 2.374 | 0.251 |
| 20 |  | 571 | 60 | 54 |  | 2.623 | 2.377 | 0.246 |
| 25 |  | 462 | 60 | 53 |  | 2.620 | 2.380 | 0.241 |
| 30 |  | 387 | 60 | 52 |  | 2.618 | 2.382 | 0.236 |
| 35 |  | 333 | 60 | 51 |  | 2.615 | 2.385 | 0.231 |
| 40 |  | 293 | 60 | 50 |  | 2.613 | 2.387 | 0.226 |
| 45 |  | 261 | 60 | 49 |  | 2.611 | 2.389 | 0.222 |
| 50 |  | 235 | 60 | 48 |  | 2.609 | 2.391 | 0.218 |
| 55 |  | 214 | 60 | 47 |  | 2.607 | 2.393 | 0.214 |
| 60 |  | 197 | 60 | 46 |  | 2.605 | 2.395 | 0.210 |
| 63 |  | 188 | 60 | 45 |  | 2.604 | 2.396 | 0.207 |

Table 2 below illustrates the manner in which the electrical properties of a RS/TIA/EIA-485 bus or communication network may vary dependent on the resistance value selected for the bias resistors 261, 262, where the number of nodes on the bus is limited to two nodes. Table 2 is premised on the same assumptions made with respect to Table 1 (i.e., the differential transmitter 222' or Co-driver will nominally drive 0 and 5V output levels, the resistance value of each of the two termination resistors 140, 141 is 120 Ohms, and the input impedance Z of each "unit load" transceiver is approximately 12 K Ohms), and the headings in Table 2 have the same meaning as described with respect to Table 1. Based upon the information shown in Tables 1 and 2, the value for the bias resistors are generally be between 200 Ohms and 1000 Ohms for most applications, for example 750 Ohms.

TABLE 2

| N-master | V | Rdrv | Rterm | Rload | RB | Va | Vb | Vab |
|---|---|---|---|---|---|---|---|---|
|  | 5 | 12000 | 120 |  |  |  |  |  |
| 1 |  | 6000 | 60 | 59 | 70000 | 2.501 | 2.499 | 0.002 |
| 1 |  | 6000 | 60 | 59 | 35000 | 2.502 | 2.498 | 0.004 |
| 1 |  | 6000 | 60 | 59 | 17500 | 2.504 | 2.496 | 0.008 |
| 1 |  | 6000 | 60 | 59 | 8750 | 2.508 | 2.492 | 0.017 |
| 1 |  | 6000 | 60 | 59 | 4375 | 2.517 | 2.483 | 0.034 |
| 1 |  | 6000 | 60 | 59 | 2188 | 2.533 | 2.467 | 0.067 |
| 1 |  | 6000 | 60 | 59 | 1094 | 2.566 | 2.434 | 0.132 |
| 1 |  | 6000 | 60 | 59 | 547 | 2.629 | 2.371 | 0.258 |
| 1 |  | 6000 | 60 | 59 | 273 | 2.745 | 2.255 | 0.490 |
| 1 |  | 6000 | 60 | 59 | 137 | 2.946 | 2.054 | 0.892 |

Figure 3:
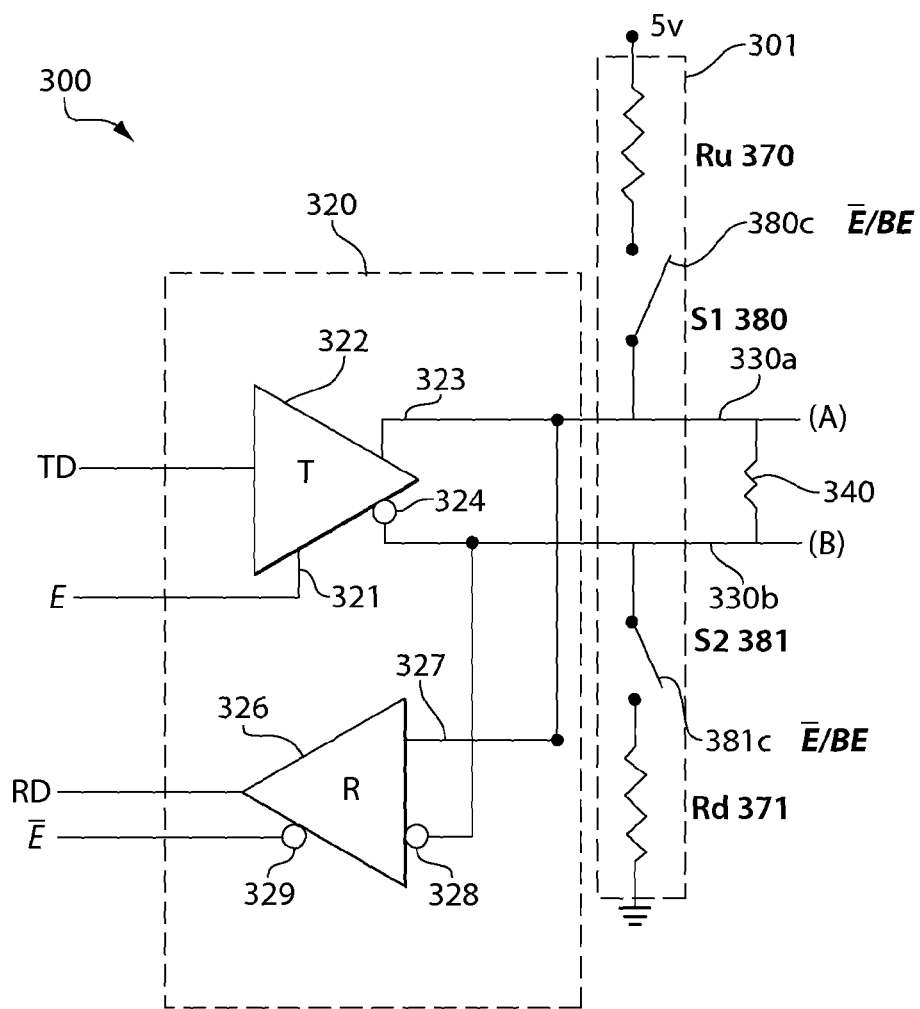
FIG. 3 is a schematic illustration of a differential bus interface that includes a differential bus biasing circuit in accordance with another embodiment of the present invention.

FIG. 3 is a schematic illustration of a differential bus interface that includes a differential bus biasing circuit in accordance with another embodiment of the present invention. As shown, the differential bus interface 300 includes a differential transceiver 320, such as an RS/TIA/EIA-485 transceiver, that is similar to the transceivers 220 and 220' described above with respect to FIG. 2 as well as to the transceivers 120a-d described above with respect to FIG. 1. Similar to the transceivers described above, the differential transceiver 320 includes a differential transmitter 322 having a non-inverting terminal 323 and an inverting terminal 324, and a differential receiver 326 having a non-inverting terminal 327 and an inverting terminal 328. Each of the differential transmitter 322 and receiver 326 includes an enable terminal 321, 329 to receive an enable signal (E or /E) to enable the transmitter or receiver. As shown in FIG. 3, a logic true (e.g., 1) state of the enable signal E enables the transmitter 322 and disables the receiver 326 and the logic false (e.g., 0) state disables the transmitter 322 and enables the receiver 326. As discussed previously, the enable signal /E is the logical inverse of the enable signal E. Where the interface 300 is associated with an end node of the bus, a termination resistor, such as termination resistor 340 may be present.

In accordance with an aspect of the present invention, the differential bus biasing circuit 301 includes a pair of relays or switches 380, 381 that are used to bias the bus to a determined state. Generally, the voltage difference necessary between the pair of wires 330a, 330b to maintain such a determined state when no transmitter is actively driving the bus is approximately 200 mV or more. As in the prior embodiment, because the first transition of the bus indicates the state of a character (e.g., a start bit), it is desirable to bias the bus so that the difference in voltage between the non-inverting pin A and the inverting pin B is approximately +200 mV or more.

In the differential bus biasing circuit 301 shown in FIG. 3, the non-inverting pin (pin A) of the differential transmitter 322 can be electrically connected to a high voltage level, such as the voltage supply Vcc, through a pull-up resistor 370 (i.e., a first resistor) via a first switch or relay 380 that is electrically coupled in series with the pull-up resistor 370. In the embodiment shown in FIG. 3, activation of the first switch or relay 380 closes the switch and electrically couples the non-inverting pin A to the voltage supply through the pull-up resistor 370. The inverting pin (pin B) of the differential transmitter 322 can be electrically connected to a ground voltage reference through a pull-down resistor 371 (i.e., a second resistor) via a second switch or relay 381 that is electrically coupled in series with the pull-down resistor 371. In the embodiment shown in FIG. 3, activation of the second switch or relay 381 closes the switch and electrically couples the inverting pin B to the ground voltage reference through the pull-down resistor 371. Preferably, each of the switches or relays 380, 381 is controlled by the same activation signal, such that both switches or relays 380, 381 are opened and closed at substantially the same time. In one embodiment, each of the switches or relays may be a single pole single throw (SPST) solid state switch, such as a type 3167 solid state switch commonly available from companies such as Texas Instruments, although other types of relays or switches may be used.

The resistance values for the pull-up and pull-down resistors 370, 371 may vary dependent upon the anticipated number of nodes on the network, and the values used for the termination resistors, but is generally selected to ensure a difference in voltage between the non-inverting pin A and the inverting pin B of approximately 200 mV or more. In accordance with one embodiment, the pull-up and pull-down resistors may each have a resistance value of 475 Ohms, although other resistance values may be used. As should be appreciated by those skilled in the art, the position of the switches or relays 380, 381 and the pull-up and pull-down resistors 370, 371 may be varied, such that the pull-up and pull-down resistors 370, 371 may alternatively be directly connected to non-inverting pin A and the inverting pin B, respectively, and the switches 380, 381 used to switchably connect the pull-up and pull-down resistors 370, 371 to Vcc and ground.

In accordance with an aspect of the present invention, each of the switches or relays 380, 381 may be controlled in one of a number of ways to bias the bus to an appropriate level. In one embodiment, a control input 380c, 381c of each of the switches or relays 380, 381 is connected to receive a suitable valued control signal, such as the inverse of the enable signal E (i.e., /E) provided to the differential transmitter 322, or a signal that is based on this signal (e.g., where the switch or relay is activated by other than a TTL logic signal). In this embodiment, the pull-up and pull-down resistors 370, 371 will bias the bus to an appropriate level during those periods of time in which the differential transmitter 322 is inactive (i.e., when the enable signal E is low and /E is high) and each switch or relay 380, 381 is closed. In an alternative embodiment, the control input 380c, 381c of each of the switches or relays 380, 381 can be connected to receive a bias enable (BE) signal that can be asserted under the programmed control of an associated processor (e.g., a processor on the device associated with the bus interface 300). In yet a further embodiment, the control input 380c, 381c of each of the switches or relays 380, 381 is connected to a logic gate (e.g., an AND gate) that receives a bias enable signal (BE) that can be asserted under the programmed control of an associated processor and an inverse of the enable signal E (i.e., /E) provided to the differential transmitter 322. In such an embodiment, the pull-up and pull-down resistors 370, 371 will bias the bus to an appropriate level only when instructed to do so by the associated processor (i.e., when the bias enable signal BE is active) and during those periods of time in which the differential transmitter 322 is inactive (i.e., when the enable signal E is low and /E is high). Where the switches or relays 380, 381 are not themselves TTL compatible, additional control circuitry (not shown) may be provided to activate (i.e., close) the switches or relays.

It should be appreciated that rather than using transceivers in FIGS. 2 and 3 described above, separate differential transmitters and receivers may alternatively be used. In addition, it should be appreciated that the bus interfaces described above with respect to FIGS. 2 and 3 may be adapted for use in a full-duplex communication network. For example, referring back to FIGS. 2 and 3, in a full-duplex differential bus interface, the transmit and receive lines (i.e., Tx+/Rx+ and Tx−/Rx−) are separate from one another and thus, the non-inverting terminal 223 (323) of the differential transmitter 222 (322) is not electrically connected to the non-inverting terminal 227 (327) of the differential receiver 226 (326) and the inverting terminal 224 (324) of the differential transmitter 222 (322) is not electrically connected to the inverting terminal 228 (328) of the differential receiver 226 (326). In such a full-duplex differential bus interface, each of the differential bus biasing circuits 201 and 301 of FIGS. 2 and 3 may be adapted to bias the full-duplex differential bus to a determined state in a manner similar to that described previously with respect to FIGS. 2 and 3.

For example, where the differential bus biasing circuit of FIG. 2 is used with a full-duplex differential bus, the non-inverting terminal 223' of the differential transmitter or Co-driver 222' can be electrically connected to the non-inverting terminal 223 of the differential transmitter 222 and the inverting terminal 224' of the differential transmitter or Co-driver 222' can be electrically connected to the inverting terminal 224 of the differential transmitter 222. This would then bias the Tx+ and Tx− lines connected to the transmitter 222, such that any receiver connected thereto (e.g., receivers in other devices) would be appropriately biased in the manner previously described. Should it be desired to also bias the non-inverting terminal 227 and the inverting terminal 228 of the differential receiver 226, an additional Co-driver may be provided with its non-inverting terminal connected to the non-inverting terminal 227 of the differential receiver 226 through a third bias resistor, and with its inverting terminal connected to the inverting terminal 228 of the differential receiver 226 through a fourth bias resistor. Each of the Co-drivers can be controlled in the manner previously described with respect to FIG. 2 (e.g., with the enable terminals of the Co-drivers connected to a high voltage, or with the enable terminals of the Co-drivers connected to receive an inverse of the enable signal E (i.e., /E), a bias enable (BE) signal, or a logical combination of the inverse of the enable signal and the bias enable signal). Where the differential receiver 226 is fail-safed for idle-bus conditions, the additional Co-driver for the differential receiver 226 may be omitted.

Where the differential bus biasing circuit of FIG. 3 is used with a full-duplex differential bus, the first switch or relay 380 and the first or pull-up resistor 370 can be electrically coupled in series between the non-inverting terminal 323 of the differential transmitter 322 and the high voltage level, and the second switch or relay 381 and the second or pull-down resistor 371 can be electrically coupled in series between the inverting terminal 324 of the differential transmitter 322 and the ground voltage reference. This would then bias the Tx+ and Tx− lines connected to the transmitter 322, such that any receiver connected thereto (e.g., in other devices) would be appropriately biased in the manner previously described. Should it be desired to also bias the non-inverting terminal 327 and the inverting terminal 328 of the differential receiver 326, an additional pair of switches or relays and pull-up and pull-down resistors may be provided, and controlled in the manner previously described with respect to FIG. 3 (e.g., with the control input of each of the additional pair of switches or relays connected to receive an inverse of the enable signal E (i.e., /E), a bias enable (BE) signal, or a logical combination of the inverse of the enable signal and the bias enable signal). Where the differential receiver 326 is fail-safed for idle-bus conditions, the additional pair of switches and pull-up and pull-down resistors may be omitted.

Figure 4:
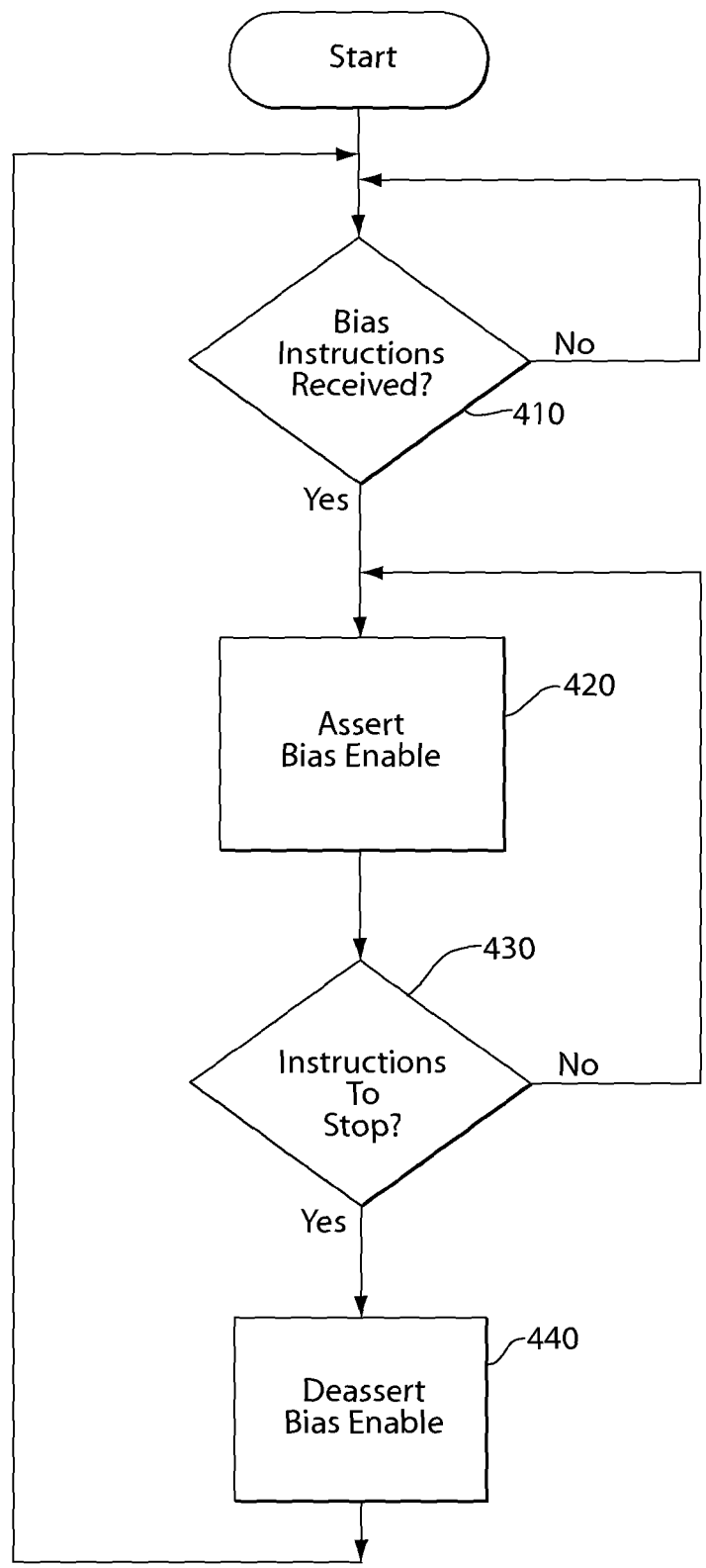
FIG. 4 is a bus biasing routine that may be executed by a processor associated with a bus biasing circuit in accordance with embodiments of the present invention to bias a bus to a determined state.

FIG. 4 illustrates a bus biasing routine that may be executed by a processor, such as a processor that is located on one of the nodes 110*a*-*d* and communicatively coupled to a bus interface, such as the differential bus interface 200 of FIG. 2, or the differential bus interface 300 of FIG. 3. The bus biasing routine would typically be executed by a processor that is associated with the node that has been designated as the master node on the bus to bias the RS/TIA/EIA-485 bus to a determined state. It should be appreciated that a RS/TIA/EIA-485 bus may have a number of different devices or nodes that could potentially be the master node on the bus, but typically only one device or node will be the master node at any given time. By having only the designated master node bias the bus to the determined state, this ensures that the bus is appropriately biased, and not over-biased where such over-biasing could impact the operation of other drivers on the bus. In most such RS/TIA/EIA-485 communication networks, there may be a secondary network or bus, for example a CAN Bus™, by which the devices or nodes can communicate with one another at a higher level to determine which device is designated the status of the master node on the RS/TIA/EIA-485 bus. In accordance with an aspect of the present invention, any node that incorporates a bus interface such as described with respect to FIGS. 2 and 3 above may potentially serve as the master node and bias the RS/TIA/EIA-485 bus to a determined state under the control of its associated processor. Thus, should an existing master node fail, or be taken out of service, another mast node may take its place and appropriately bias the bus.

In act 410, the bus biasing routine makes a determination as to whether it has received an instruction to bias the RS-TIA/EIA-485 bus to a determined state. This instruction may be received over the RS/TIA/EIA-485 bus from another device or node on the RS/TIA/EIA-485 bus, or received over a different communication channel than the RS/TIA/EIA-485 bus. Alternatively still, this instruction may be received via an external interface, such as from a keyboard or other type of input device that is communicatively coupled to the processor of the device associated with the differential bus interfaces 200 or 300. Where the bus biasing routine determines in act 410 that it has not received any instructions to bias the bus, it simply waits until such an instruction is received. Alternatively, where the bus biasing routine makes a determination in act 410 that it has received an instruction to bias the RS/TIA/EIA-485 bus, it proceeds to act 420.

In act 420, the bus biasing routine asserts a bias enable signal BE on a programmable output pin of a processor that is operatively coupled to the enable input 221' of the Co-driver 222' of the bus interface 200 (FIG. 2) or to the control input of each of the switches or relays 380, 381 of the bus interface 300 (FIG. 3). As noted previously, this bias enable signal BE may be provided directly to the enable input 221' of the differential transmitter 222 of the bus interface 200 or to the control input of each of the switches or relays 380, 381 of the bus interface 300, or may alternatively be provided indirectly, such as via an AND gate that receives the bias enable signal BE and an inverse of the enable signal E (i.e., /E) provided to the differential transmitter 222 or 322. Where the bias enable signal BE is provided directly to the to the enable input 221' of the differential transmitter 222 of the bus interface 200 or to the control input of each of the switches or relays 380, 381 of the bus interface 300, the RS/TIA/EIA-485 bus will be biased as long as the bias enable signal BE is asserted. Alternatively, where the bias enable signal BE is provided indirectly to the enable input 221' of the differential transmitter 222 of the bus interface 200 or to the control input of each of the switches or relays 380, 381 of the bus interface 300, such as via the output of an AND gate that receives the bias enable signal BE and the inverse of the enable signal (/E), the RS/TIA/EIA-485 bus will only be biased during those periods of time in which the bias enable signal BE is asserted and the differential transmitter 222, 322 is not actively driving the bus.

In act 430, the bus biasing routine makes a determination as to whether it has received any instructions to stop biasing the bus. Such an instruction may be as a result of a communication indicating that another device or node on the bus has been designated the master node or where a determination is made that the master node has failed or been taken out of service. Where it is determined in act 430 that no such instruction to stop biasing the bus has been received, the bus biasing routine returns to act 420 and continues to assert the bias enable signal BE. Alternatively, where it is determined in act 430 that an instruction has been received to stop biasing the bus, the routine proceeds to act 440 wherein the bias enable signal BE is de-asserted. In response to de-asserting the bias enable signal BE, the bus biasing routine may proceed back to act 410 and await an instruction to bias the bus.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A bi-directional differential bus interface comprising:
 a differential transmitter having a non-inverting terminal, an inverting terminal, and an enable terminal configured to receive an enable signal;
 a differential receiver having a non-inverting terminal and an inverting terminal; and
 a biasing circuit electrically coupled to the non-inverting terminal of the differential transmitter and the inverting terminal of the differential transmitter, the biasing circuit being configured to:
  receive the enable signal; and
  generate a voltage difference between the non-inverting terminal of the differential transmitter and the inverting terminal of the differential transmitter that is at least approximately 200 mV in response to assertion of a control signal based on the enable signal and received on a control input of the biasing circuit,
 wherein the differential transmitter and the differential receiver are disposed in a single integrated circuit transceiver, the non-inverting terminal of the differential transmitter is electrically connected to the non-inverting terminal of the differential receiver, and the inverting terminal of the differential transmitter is electrically connected to the inverting terminal of the differential receiver.

2. The bi-directional differential bus interface of claim 1, wherein the differential transmitter is a first differential transmitter and wherein the biasing circuit includes:
 a first bias resistor;
 a second bias resistor; and
 a second differential transmitter having a non-inverting terminal that is electrically coupled to the non-inverting terminal of the first differential transmitter through the first bias resistor and an inverting terminal that is electrically coupled to the inverting terminal of the first differential transmitter through the second bias resistor.

3. The bi-directional differential bus interface of claim 2, wherein the second differential transmitter has an enable terminal and wherein the enable terminal of the second differential transmitter is configured to receive the control signal.

4. The bi-directional differential bus interface of claim 3, wherein the control signal is a logical inverse of the enable signal.

5. The bi-directional differential bus interface of claim 3, wherein the bi-directional differential bus interface is associated with a processor configured to assert the control signal in response to an instruction that the bi-directional differential bus interface is to be biased.

6. The bi-directional differential bus interface of claim 3, wherein the bi-directional differential bus interface is associated with a processor configured to assert a bias enable signal in response to an instruction that the bi-directional differential bus interface is to be biased, wherein the control signal is asserted based on assertion of the bias enable signal and a logical inverse of the enable signal.

7. The bi-directional differential bus interface of claim 2, wherein the bi-directional differential bus interface is a full-duplex bi-directional differential bus interface, the bi-directional differential bus interface further comprising:
 a third bias resistor;
 a fourth bias resistor; and
 a third differential transmitter having a non-inverting terminal that is electrically coupled to the non-inverting terminal of the differential receiver through the third bias resistor, an inverting terminal that is electrically coupled to the inverting terminal of the differential receiver through the fourth bias resistor, and an enable terminal to receive the control signal, the third differential transmitter being configured to generate a voltage between the non-inverting terminal of the differential receiver and the inverting terminal of the differential receiver that is at least 200 mV in response to assertion of the control signal.

8. The bi-directional differential bus interface of claim 1, wherein the biasing circuit includes:
 a first switch electrically coupled in series with a first resistor, the first switch and the first resistor being coupled in series between the a voltage supply terminal and the non-inverting terminal of the differential transmitter, the first switch having a control terminal configured to electrically couple the non-inverting terminal of the differential transmitter to the voltage supply terminal through the first resistor in response to assertion of the control signal; and
 a second switch electrically coupled in series with a second resistor, the second switch and the second resistor being coupled in series between the a reference voltage terminal and the inverting terminal of the differential transmitter, the second switch having a control terminal configured to electrically couple the inverting terminal of the differential transmitter to the voltage reference terminal through the second resistor in response to assertion of the control signal.

9. The bi-directional differential bus interface of claim 8, wherein the bi-directional differential bus interface is associated with a processor configured to assert the control signal in response to an instruction that the differential bus interface is to be biased.

10. The bi-directional differential bus interface of claim 8, wherein the bi-directional differential bus interface is associated with a processor configured to assert a bias enable signal in response to an instruction that the bi-directional differential bus interface is to be biased, wherein the control signal is asserted based on assertion of the bias enable signal and a logical inverse of the enable signal.

11. A method of biasing a bi-directional differential bus interface that includes a differential transmitter having a non-inverting terminal, an inverting terminal, and an enable terminal configured to receive an enable signal, and a differential receiver having a non-inverting terminal and an inverting terminal, the method comprising acts of:
receiving the enable signal to bias the bi-directional bus interface to a determined state;
asserting a control signal based on the enable signal; and
generating, in a biasing circuit that is electrically coupled to the non-inverting terminal of the differential transmitter and the inverting terminal of the differential transmitter, a voltage that is at least approximately 200 mV between the non-inverting terminal of the differential transmitter and the inverting terminal of the differential transmitter in response to the assertion of the control signal,
wherein the enable signal is asserted during transmission of data by the differential transmitter, and wherein the act of generating is performed only during those periods of time in which the enable signal is not asserted.

12. The method of claim 11, further comprising acts of:
receiving an instruction to stop biasing the bi-directional differential bus interface to the determined state;
de-asserting the control signal in response to receipt of the instruction; and
ceasing to generate the voltage in response to the de-assertion of the control signal.

13. The method of claim 11, wherein the differential transmitter is a first differential transmitter, and wherein the act of generating includes:
generating the voltage difference using a second differential transmitter having a non-inverting terminal that is electrically coupled to the non-inverting terminal of the first differential transmitter through a first resistor and an inverting terminal that is electrically coupled to the inverting terminal of the first differential transmitter through a second resistor.

14. The method of claim 11, wherein the act of generating includes:
switchably connecting the non-inverting terminal of the differential transmitter to a voltage supply terminal through a first resistor; and
switchably connecting the inverting terminal of the differential transmitter to a voltage reference terminal through a second resistor.

15. A bi-directional differential bus interface comprising:
a differential transmitter having a non-inverting terminal, an inverting terminal, and an enable terminal configured to receive an enable signal;
a differential receiver having a non-inverting terminal and an inverting terminal; and
means, electrically coupled to the non-inverting terminal of the differential transmitter and the inverting terminal of the differential transmitter, for generating a voltage between the non-inverting terminal of the differential transmitter and the inverting terminal of the differential transmitter that is at least approximately 200 mV in response to receipt of the enable signal,
wherein the differential transmitter and the differential receiver are disposed in a single integrated circuit transceiver, the non-inverting terminal of the differential transmitter is electrically connected to the non-inverting terminal of the differential receiver, and the inverting terminal of the differential transmitter is electrically connected to the inverting terminal of the differential receiver.

16. The bi-directional differential bus interface of claim 15, wherein the differential transmitter is a first differential transmitter, and wherein the means for generating the voltage difference includes:
a first bias resistor;
a second bias resistor; and
a second differential transmitter having a non-inverting terminal that is electrically coupled to the non-inverting terminal of the first differential transmitter through the first bias resistor and an inverting terminal that is electrically coupled to the inverting terminal of the first differential transmitter through the second bias resistor.

17. The bi-directional differential bus interface of claim 15, wherein the means for generating the voltage difference includes:
a first switch electrically coupled in series with a first resistor, the first switch and the first resistor being electrically coupled in series between the a voltage supply terminal and the non-inverting terminal of the differential transmitter, the first switch having a control terminal configured to electrically couple the non-inverting terminal of the differential transmitter to the voltage supply terminal through the first resistor in response to receipt of the enable signal; and
a second switch electrically coupled in series with a second resistor, the second switch and the second resistor being electrically coupled in series between a reference voltage terminal and the inverting terminal of the differential transmitter, the second switch having a control terminal configured to electrically couple the inverting terminal of the differential transmitter to the voltage reference terminal through the second resistor in response to assertion of the enable signal.

18. The bi-directional differential bus interface of claim 16, wherein the bi-directional differential bus interface is associated with a processor configured to assert a bias enable signal in response to an instruction that the bi-directional differential bus interface is to be biased.

* * * * *